US009366360B2

(12) United States Patent
Alcorn

(10) Patent No.: US 9,366,360 B2
(45) Date of Patent: Jun. 14, 2016

(54) CORD BRACKET AND METHOD OF USE

(71) Applicant: A. Shane Alcorn, Smithfield, UT (US)

(72) Inventor: A. Shane Alcorn, Smithfield, UT (US)

(*) Notice: Subject to any disclaimer, the term of this patent is extended or adjusted under 35 U.S.C. 154(b) by 0 days.

(21) Appl. No.: 14/263,325

(22) Filed: Apr. 28, 2014

(65) Prior Publication Data

US 2015/0369422 A1    Dec. 24, 2015

Related U.S. Application Data

(60) Provisional application No. 61/823,057, filed on May 14, 2013.

(51) Int. Cl.
| *F16L 3/08* | (2006.01) |
| *F16L 3/00* | (2006.01) |
| *F16M 13/02* | (2006.01) |
| *H02G 11/00* | (2006.01) |
| *A47G 1/17* | (2006.01) |
| *D06F 75/28* | (2006.01) |
| *F16B 1/00* | (2006.01) |

(52) U.S. Cl.
CPC ... *F16L 3/00* (2013.01); *A47G 1/17* (2013.01); *F16M 13/022* (2013.01); *H02G 11/003* (2013.01); *D06F 75/28* (2013.01); *F16B 2001/0035* (2013.01)

(58) Field of Classification Search
CPC .... F16M 13/022; H02G 11/003; F16G 13/16; D06F 75/28; A47G 1/17; F16B 2001/0035; F16L 3/00

USPC ............ 248/74.1, 206.5, 51, 74.2, 52, 345.1, 248/220.1
See application file for complete search history.

(56) References Cited

U.S. PATENT DOCUMENTS

| 4,025,015 | A | * | 5/1977 | Kolic ........................ 248/205.3 |
| 4,576,664 | A | * | 3/1986 | Delahunty ...................... 156/71 |
| 4,702,443 | A | * | 10/1987 | Callaway ........................ 248/51 |
| 4,910,362 | A | * | 3/1990 | Kinner ........................... 174/135 |
| 5,188,609 | A | * | 2/1993 | Bayless et al. ................ 604/180 |
| 5,323,992 | A | * | 6/1994 | Sifers et al. ................ 248/205.3 |
| 5,695,165 | A | * | 12/1997 | Moriarty ..................... 248/316.8 |
| 5,944,696 | A | * | 8/1999 | Bayless et al. ................ 604/174 |
| 6,105,922 | A | * | 8/2000 | Derman ........................ 248/551 |
| 6,126,135 | A | * | 10/2000 | Derman ........................ 248/551 |
| 6,431,500 | B1 | * | 8/2002 | Jacobs et al. ..................... 248/51 |
| 7,607,618 | B2 | * | 10/2009 | Mori et al. .................... 248/68.1 |
| 8,042,774 | B2 | * | 10/2011 | Davis et al. .................. 248/68.1 |

* cited by examiner

*Primary Examiner* — Anita M King
(74) *Attorney, Agent, or Firm* — Michael R. Schramm

(57) ABSTRACT

The present invention is a cord bracket use in temporarily securing electrical cords and the like so as to prevent such electrical cords from marring door casings or wall corners. The device preferably defines a bracket having means for securing a cord and being adapted to magnetically adhere to a door casing or wall corner. The bracket may include a loop or a slot type holding feature. Magnets of the bracket preferably include a protective plastic layer to prevent the magnet from causing damage to the door casing or wall corner.

11 Claims, 6 Drawing Sheets

CORD BRACKET AND METHOD OF USE

CROSS REFERENCE TO RELATED APPLICATIONS

This U.S. nonprovisional utility patent application claims the benefit under 35 USC §119(e) of US provisional application No. 61/823,057 filed May 14, 2013 which is expressly incorporated herein in its entirety by this reference.

FIELD OF THE INVENTION

The present invention relates to brackets, and more especially brackets for use in temporarily securing electrical cords and the like so as to prevent such electrical cords from marring door casings or wall corners.

BACKGROUND OF THE INVENTION

Electrical appliances such mopping and buffing machines and vacuum cleaners are commonly used in cleaning builds. Such electrical appliances typically have a cord for use in electrically powering such devices. In the process of using such appliances, such cords are drug or pulled from location to location. However, as a consequence of such dragging of such cords, such cords are often pulled against door casings, wall corners, or the like and commonly mar such door casings and wall corners by leaving marks on the door casing or wall corner (e.g. a small portion of the plastic cord casing rubbing off onto the door casing or wall corner) and/or by chipping paint from the door casing or wall corner.

SUMMARY OF THE INVENTION

The present invention is a cord bracket use in temporarily securing electrical cords and the like so as to prevent such electrical cords from marring door casings or wall corners. The device preferably defines a bracket having means for securing a cord and being adapted to magnetically adhere to a door casing or wall corner. The bracket may include a loop or a slot type holding means. Magnets of the bracket preferably include a protective plastic layer to prevent the magnet from causing damage to the door casing or wall corner.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In order to facilitate the understanding of the present invention in reviewing the drawings accompanying the specification, a feature list is provided below. It is noted that like features are like numbered throughout all of the figures.

FEATURE TABLE

| # | Feature | # | Feature |
|---|---|---|---|
| 10 | Cord bracket | 12 | Channel |
| 14 | Channel inner surface | 16 | Channel outer surface |
| 18 | Magnet | 20 | Magnet fastener |
| 22 | Loop | 24 | Loop fastener |
| 26 | Electrical cord | 28 | Door casing |
| 40 | Cord bracket | 42 | Grip |
| 44 | Grip retention Slot | 46 | Grip faying surface |
| 48 | Swivel base | 50 | Magnet |
| 52 | Protective coating | 54 | Electrical cord |
| 56 | Door casing | | |
| 80 | Cord bracket | 82 | Body |
| 84 | Body loop | 86 | Body knob |
| 88 | Body faying surface (not shown) | 90 | Swivel base |
| 92 | Magnet | 94 | Electrical cord |
| 96 | Door casing | | |

Figure 1:
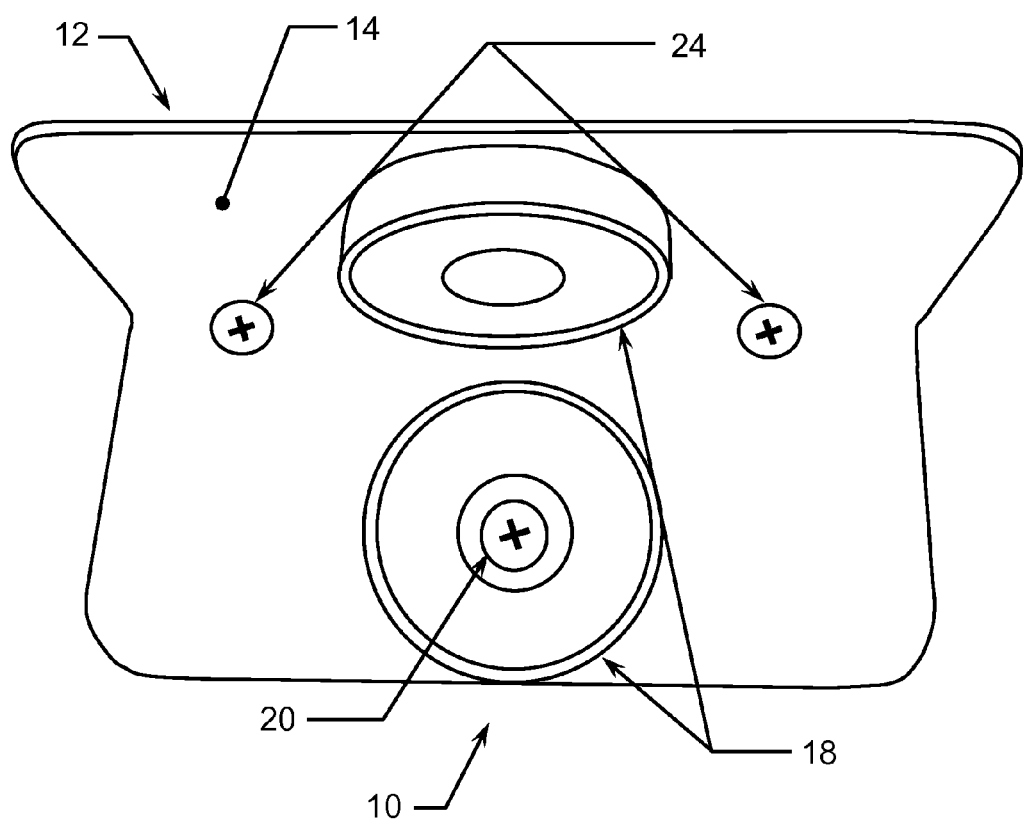
FIG. 1 is a trimetric view of a first embodiment of the cord bracket showing the inner (door casing facing) surfaces.
Figure 2:
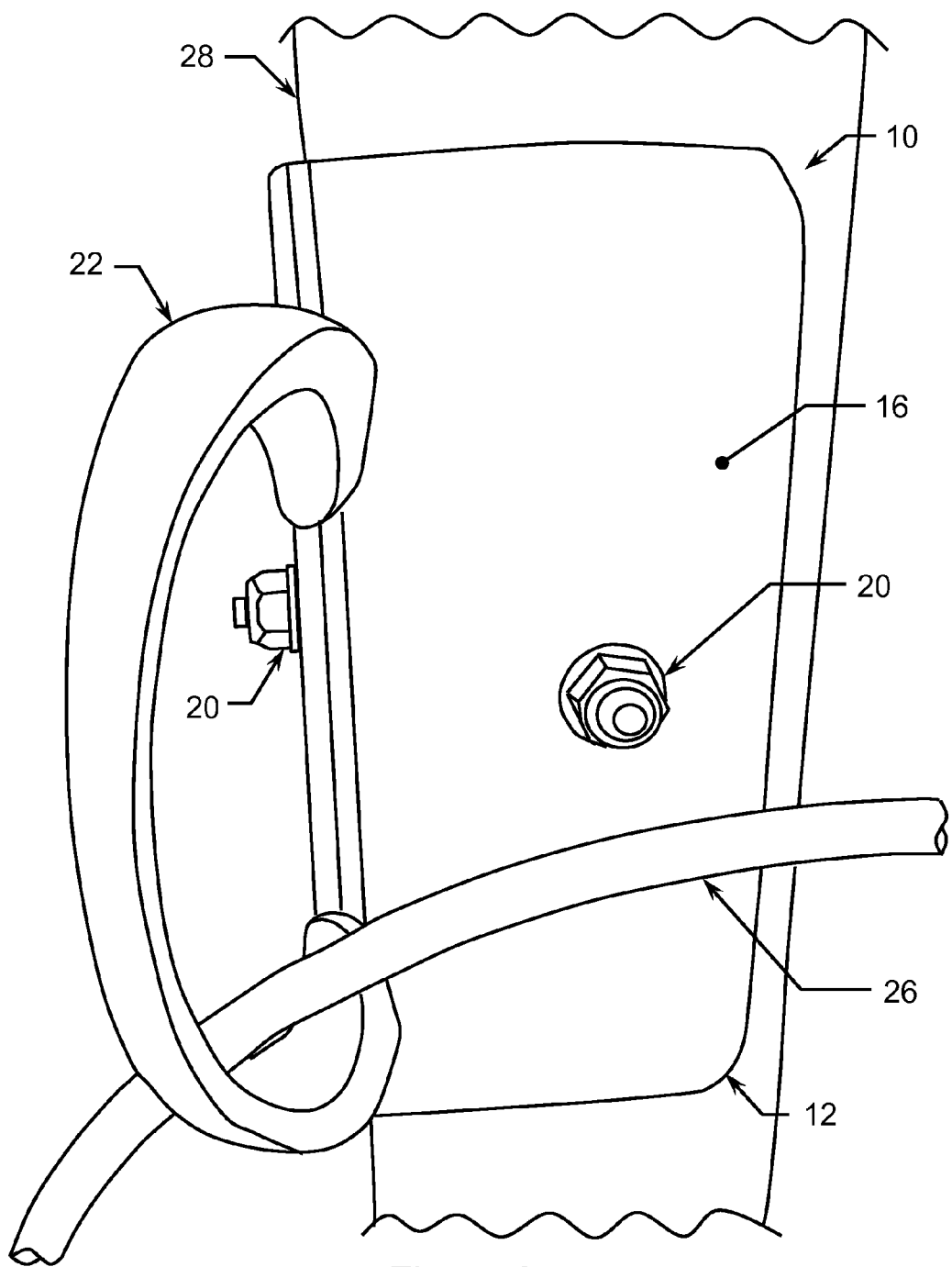
FIG. 2 is a trimetric view of the cord bracket of FIG. 1 shown magnetically adhered to a door casing and having an electrical cord held by the loop of the cord bracket.

Referring now to the drawings, and in particular to FIGS. 1 and 2, a first embodiment of the invention is a cord bracket 10 for use in temporarily securing an electrical cord 26 to a door casing 28 or the like comprising a preferably 90 deg angled channel 12 having a plurality of magnets 18, each of magnets 18 preferably having a protective plastic coating and being connected to an inner surface 14 of channel 12 by means of magnet fasteners 20 and a loop 22 connected to an outer surface 16 of channel 12 by means of loop fasteners 24. In practice, cord bracket 10 is temporarily mounted to door casing 28 by placing cord bracket 10 into contact with door casing 28 such that magnets 18 magnetically adhere to door casing 28. With the cord bracket 10 temporarily mounted to door casing 28, electrical cord 26 of an appliance such as a vacuum cleaner is threaded through loop 22 of the cord bracket 10. With electrical cord 26 threaded through loop 22, the appliance is used with electrical cord 26 of the appliance free to move through loop 22 and yet being prevented from rubbing against door casing 28, thus preventing marring or damaging door casing 28 from rubbing of electrical cord 26 on door casing 28.

Figure 3:
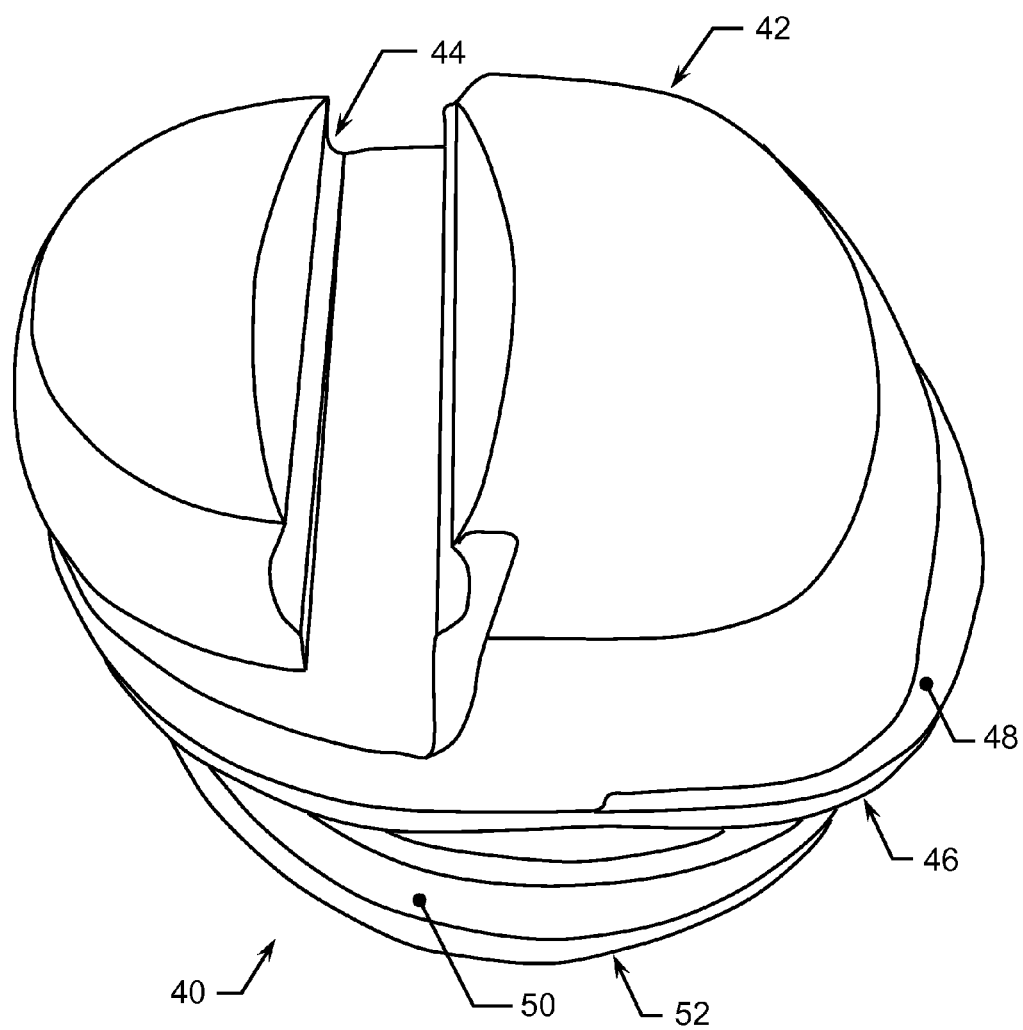
FIG. 3 is a trimetric view of a second embodiment of the cord bracket.
Figure 4:
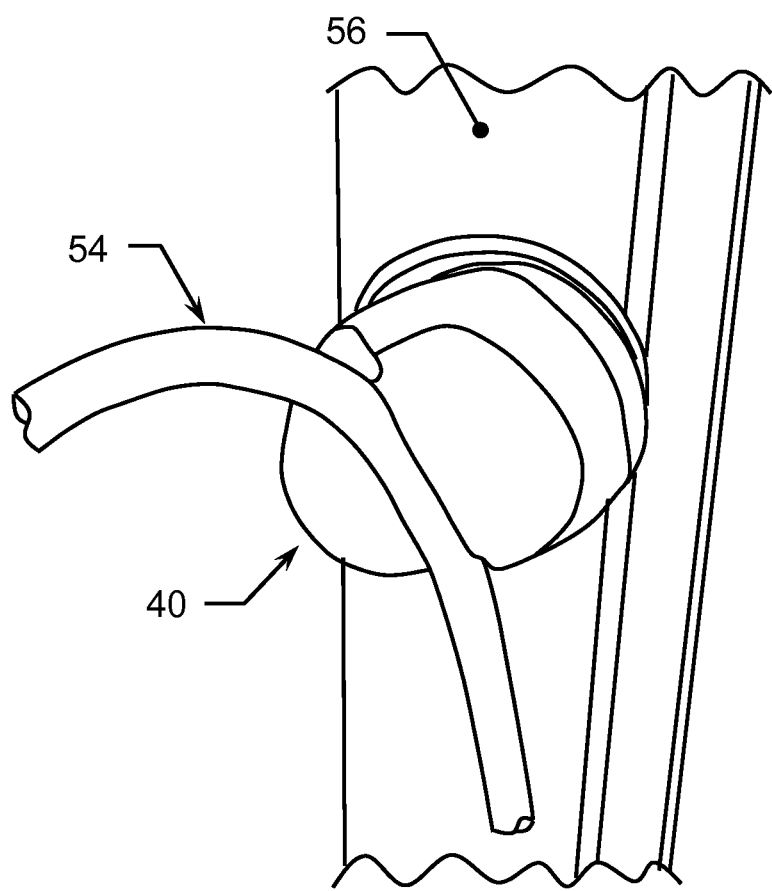
FIG. 4 is a trimetric view of the cord bracket of FIG. 3 shown magnetically adhered to a door casing and having an electrical cord held by the retention slot of the cord bracket.

Referring now to the drawings, and in particular to FIGS. 3 and 4, a second embodiment of the invention is a cord bracket 40 for use in temporarily securing an electrical cord 54 to a door casing 56 or the like comprising a grip 42 connected to a swivel base 48 by means of bonding a grip faying surface 46 to swivel base 48 and swivel base 48 connected to a magnet 50 preferably having a protective plastic coating 52 thereon. Grip 42 is preferably constructed of a plastic having a degree of flexibility and includes a retention slot 44 formed therein. In practice, cord bracket 40 is temporarily mounted to door casing 56 by placing cord bracket 40 into contact with door casing 56 such that magnet 50 magnetically adheres to door casing 56. With cord bracket 40 temporarily mounted to door casing 56, electrical cord 54 of an appliance such as a vacuum cleaner is pressed into retention slot 44. With electrical cord 54 retained by retention slot 44, the appliance is used with electrical cord 54 of the appliance free to rotate and yet being prevented from rubbing against door casing 56, thus preventing marring or damaging door casing 56 from rubbing of electrical cord 54 on door casing 56. It is noted that in an alternative embodiment, a suction cup is substituted for magnet 50 such that rather magnetically adhering cord bracket 40 to door casing 56, cord bracket 40 is adhered to door casing 56 by means of a partial vacuum being created between the suction cup and door casing 56. Further, other additional means of securing cord bracket 40 to door casing 56, such as a semi-adhesive putty, are also contemplated.

Figure 5:
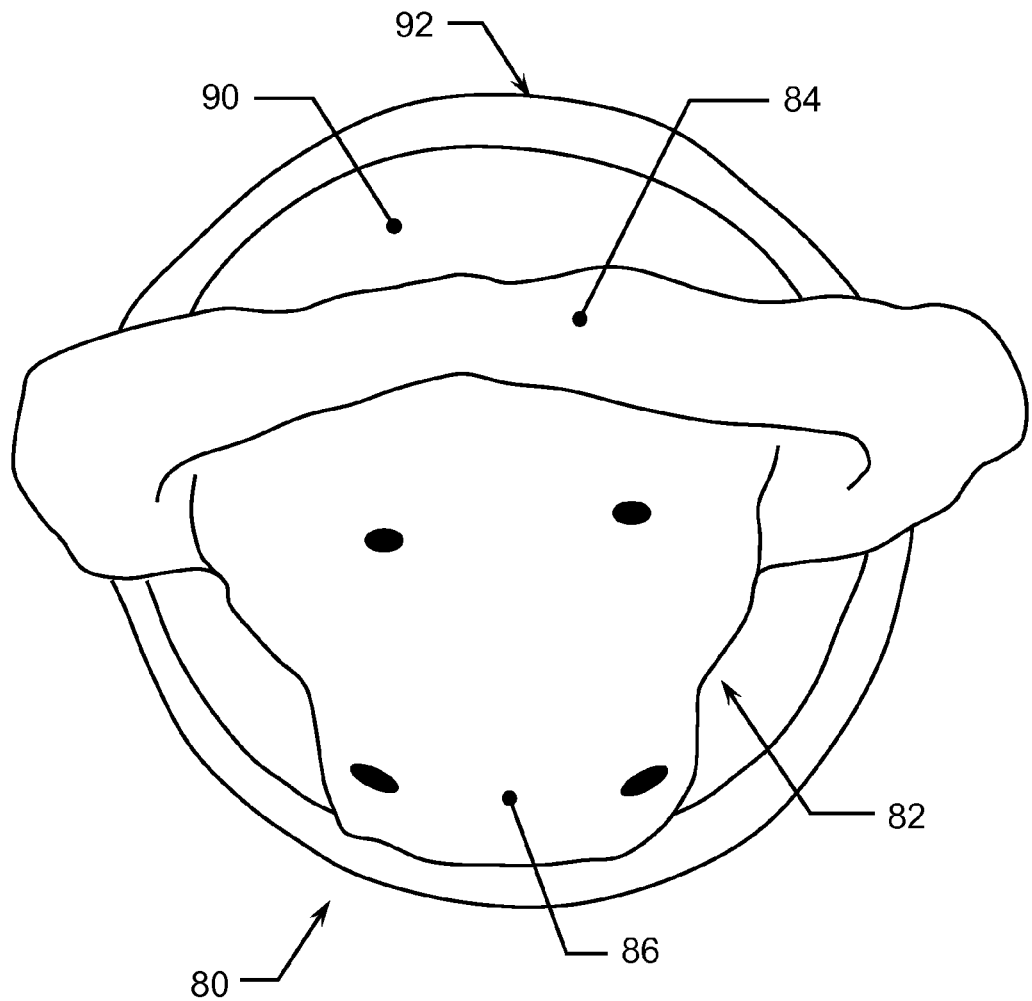
FIG. 5 is a trimetric view of a third embodiment of the cord bracket.
Figure 6:
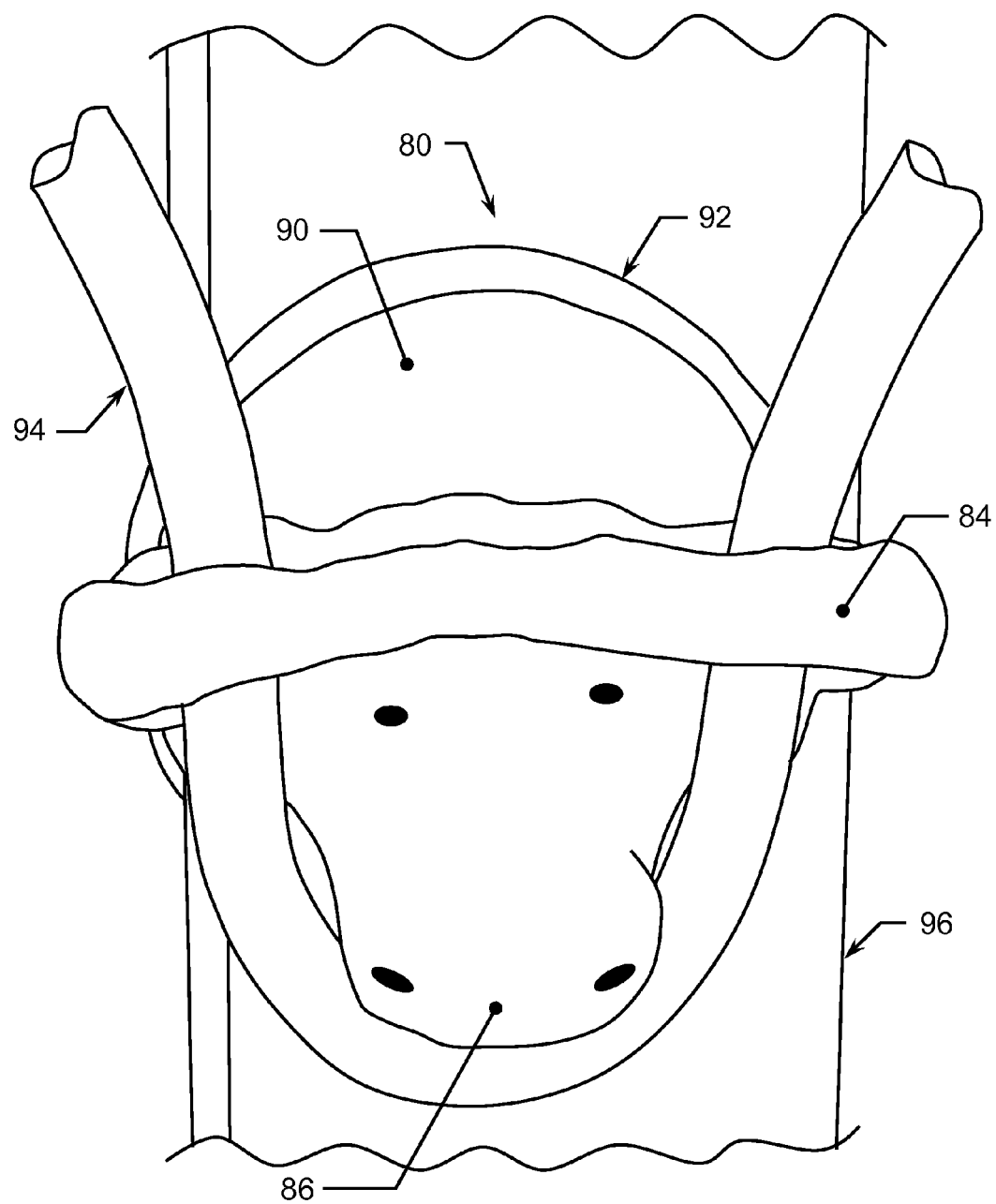
FIG. 6 is a trimetric view of the cord bracket of FIG. 5 shown magnetically adhered to a door casing and having an electrical cord held by the knob and loop of the cord bracket.

Referring now to the drawings, and in particular to FIGS. 5 and 6, a third embodiment of the invention is a cord bracket 80 for use in temporarily securing an electrical cord 94 to a door casing 96 or the like comprising a body 82 connected to a swivel base 90 by means of bonding a body faying surface 88 to swivel base 90 and swivel base 90 connected to a magnet 92 preferably having a protective plastic coating thereon. Body 82 is preferably constructed of a plastic and includes a loop 84 and a knob 86 formed thereon. In practice, cord bracket 80 is temporarily mounted to door casing 96 by placing cord bracket 80 into contact with door casing 96 such that magnet 92 magnetically adheres to door casing 96. With cord bracket 80 temporarily mounted to door casing 96, electrical cord 94 of an appliance such as a vacuum cleaner is threaded through loop 84 of cord bracket 80 and over knob 86 of cord bracket 80. With electrical cord 94 retained by body 82, the appliance is used with electrical cord 94 of the appliance free to rotate and yet being prevented from rubbing against door casing 96, thus preventing marring or damaging door casing 96 from rubbing of electrical cord 94 on door casing 96.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cord bracket apparatus having a body, a swivel base, and at least one magnet, wherein said body includes at least one cord retention member defining a loop and knob combination, and wherein said body is connected to a first side of said swivel base and said magnet is swivelably connected to a second side of said swivel base, and wherein said apparatus is adapted such that when said apparatus is magnetically mounted to a structure and a cord of an appliance is secured to said cord retention member and said appliance is manipulated, said apparatus prevents marring of said structure by said cord, and wherein said securement of said cord to said cord retention member defines said cord being threaded through said loop and over said knob.

2. The apparatus of claim 1, wherein said body defines at least one of a rigid body and a flexible body.

3. The apparatus of claim 1, wherein when an appliance manipulation induced pulling load is applied to said cord, said cord remains retained by said cord retention member.

4. The apparatus of claim 1, wherein said magnet includes a protective cover thereon adapted to prevent marring of said structure by said magnet.

5. The apparatus of claim 1, wherein in response to a pulling load applied to said cord secured to said apparatus, said apparatus swivels without releasing from said structure.

6. A cord bracket apparatus defining a body having at least one closed loop cord retention member including a knob and a mounting member adapted to temporarily mount said apparatus to a structure, wherein said apparatus is adapted such that when said apparatus is temporarily mounted to a structure and a cord of an appliance is passed through said closed loop cord retention member and around said knob said cord is substantially free to move through said closed loop cord retention member and yet said cord is retained by said at least one closed loop cord retention member, and wherein when said appliance is manipulated, said apparatus prevents marring of said structure by said cord.

7. The apparatus of claim 6, wherein said apparatus includes a swivel base.

8. The apparatus of claim 6, wherein said body defines at least one of a rigid body and a flexible body.

9. The apparatus of claim 6, wherein when an appliance manipulation induced pulling load is applied to said cord, said cord moves through said at least one closed loop cord retention member and yet said cord remains retained by said closed loop cord retention member.

10. The apparatus of claim 6, wherein said mounting member includes a protective cover thereon adapted to prevent marring of said structure by said mounting member.

11. The apparatus of claim 6, wherein in response to a pulling load applied to said cord secured to said apparatus, said apparatus swivels without releasing from said structure.

\* \* \* \* \*